(12) United States Patent
Smyth

(10) Patent No.: US 6,331,693 B1
(45) Date of Patent: Dec. 18, 2001

(54) BEAM DELIVERY SYSTEM

(75) Inventor: Dale Smyth, Lawrenceburg, IN (US)

(73) Assignee: Cincinnati Incorporated, Harrison, OH (US)

( * ) Notice: Subject to any disclaimer, the term of this patent is extended or adjusted under 35 U.S.C. 154(b) by 0 days.

(21) Appl. No.: 09/344,772

(22) Filed: Jun. 28, 1999

(51) Int. Cl.$^7$ .............................. B23K 26/14; B23K 26/16
(52) U.S. Cl. ................................ 219/121.84; 219/121.85
(58) Field of Search ........................... 219/121.84, 121.85

(56) References Cited

U.S. PATENT DOCUMENTS

| | | | |
|---|---|---|---|
| 4,774,416 | * 9/1988 | Askary et al. | 250/492.2 |
| 4,896,015 | * 1/1990 | Taboada et al. | 219/121.78 |
| 5,182,430 | * 1/1993 | Lagain | 219/121.63 |
| 5,227,606 | * 7/1993 | Weeks et al. | 219/121.67 |
| 5,237,150 | * 8/1993 | Karube | 219/121.72 |
| 5,771,260 | * 6/1998 | Elliot et al. | 372/109 |

FOREIGN PATENT DOCUMENTS

| | | | |
|---|---|---|---|
| 359156588A | * | 9/1984 | (JP) . |
| 360003992A | * | 1/1985 | (JP) . |
| 363056388A | * | 3/1988 | (JP) . |
| 401143782A | * | 6/1989 | (JP) . |
| 403151185A | * | 6/1991 | (JP) . |

* cited by examiner

Primary Examiner—Tom Dunn
Assistant Examiner—Kiley Stoner
(74) Attorney, Agent, or Firm—Wood, Herron & Evans, L.L.P.

(57) ABSTRACT

A photon energy beam delivery system has a gas delivery tube extending generally the length of the beam path, having a plurality of openings oriented generally toward the beam path. Gas is discharged through the openings, flowing proximal to the beam path, resulting in the desired gas movement within the beam path throughout a sufficient length of the beam path, thereby reducing, eliminating or minimizing degradation of the beam.

23 Claims, 3 Drawing Sheets

BEAM DELIVERY SYSTEM

TECHNICAL FIELD

The present invention relates generally to photon beam delivery systems, and is particularly directed to a system which eliminates or reduces degradation of a photon energy beam providing a consistent and symmetrical power distribution for the length of a photon energy beam. The invention will be specifically disclosed in connection with an industrial laser cutter having an enclosed beam delivery system.

BACKGROUND OF THE INVENTION

The use of photon energy beams is well known. Photon energy beams can be used for a variety of purposes, ranging for example from the transmission of signals and information to the cutting of material, such as the use of lasers to cut sheet metal. At least when used for cutting, it typically is desirable for the photon energy beam to have a radially symmetrical power distribution which is constant along the length of the beam. However, in some instances the power distribution of the photon energy beam, when it reaches its target, is not consistent and symmetrical. An asymmetric power distribution reduces the efficiency of the photon energy beam. Such a non-consistent and asymmetric power distribution is particularly troublesome when the beam is used to cut material.

The initial quality of a photon energy beam is dependant on the resonator which generates the beam. It is widely acknowledged that the gas through which a photon energy beam propagates in a photon beam delivery system can adversely affect the beam. In systems in which the length of the beam path through the gas varies, such as in laser cutters with moving optics, the beam quality frequently degrades as the beam path increases. Degradation in beam quality, between the resonator and the beam's target, is often attributed to contaminants and impurities of the gas within the photon beam delivery system in the beam path, affecting characteristics such as the beam quality K factor and the divergence.

In non-sealed beam delivery systems, it is known to provide a purge system which introduces a flow of very clean, dry purge gas, such as air or nitrogen, into an enclosure surrounding the beam, creating a positive pressure within the enclosure. Since the enclosure is not sealed, the positive pressure guarantees that gas will flow from the interior of the enclosure to the ambient environment to prevent ambient contaminants and impurities from entering the enclosure. However, such positive pressure systems are not necessarily 100% effective at keeping contaminants and impurities out. For example, photon beam delivery systems on laser cutters typically use bellows to enclose the beam. During rapid movements of the gantry carrying the nozzle and beam delivery system, ambient air carrying impurities and contaminants can be pumped into the enclosure by the expansion and contraction of the bellows despite the use of a purge system.

It has been suggested that the presence of $CO_2$ in the beam path is the source of beam propagation degradation. Although $CO_2$ scrubbers are available, they are more expensive than the typical air cleaners. Additionally, even if $CO_2$ is removed from the gas introduced by a purge system, ambient impurities and contaminants may still be present within the enclosure of a non-sealed beam delivery system.

There is a need in the art for a beam delivery system which eliminates, reduces or minimizes degradation of the photon energy beam along the length of the beam path, delivering to the target a beam having substantially the same beam quality as generated by the resonator. There is a need in the art for a beam delivery system which delivers the same beam quality regardless of the length of the beam path.

SUMMARY OF THE INVENTION

It is an object of this invention to obviate the above-described problems and shortcomings of the prior art heretofore available.

It is another object of the present invention to provide a beam delivery system which eliminates, reduces or minimizes degradation of a photon energy along the beam path.

It is yet another object of the present invention to provide a beam delivery system which delivers a beam to its target which is radially symmetrical.

It is still another object of the present invention to provide a beam delivery system which provides a power distribution which is constant along the length of the beam path without significant cost.

It is another object of the present invention to provide a beam delivery system which delivers a beam having consistent quality throughout the range of beam path lengths.

It is yet another object of the present invention to provide a beam delivery system which prevents or reduces thermal or density gradients proximal to the beam path.

It is another object of the present invention to provide a beam delivery system which can be used without specific gases or gas conditioning.

It is still another object of the present invention to provide a beam delivery system which delivers gas uniformly or at discrete points along the beam path. Additional objects, advantages and other novel features of the invention will be set forth in part in the description that follows and in part will become apparent to those skilled in the art upon examination of the following or may be learned with the practice of the invention. The objects and advantages of the invention may be realized and obtained by means of the instrumentalities and combinations particularly pointed out in the appended claims.

To achieve the foregoing and other objects, and in accordance with the purposes of the present invention as described herein, there is provided a beam delivery system with a gas delivery tube extending generally the length of the beam path, having a plurality of openings oriented toward the beam path. Gas is discharged through the openings, flowing proximal to the beam path.

BRIEF DESCRIPTION OF THE DRAWINGS

The accompanying drawings incorporated in and forming a part of the specification illustrate several aspects of the present invention, and together with the description serve to explain the principles of the invention. In the drawings.

Reference will now be made in detail to the present preferred embodiment of the invention, an example of which is illustrated in the accompanying drawings.

DETAILED DESCRIPTION OF THE PREFERRED EMBODIMENT

Figure 1:
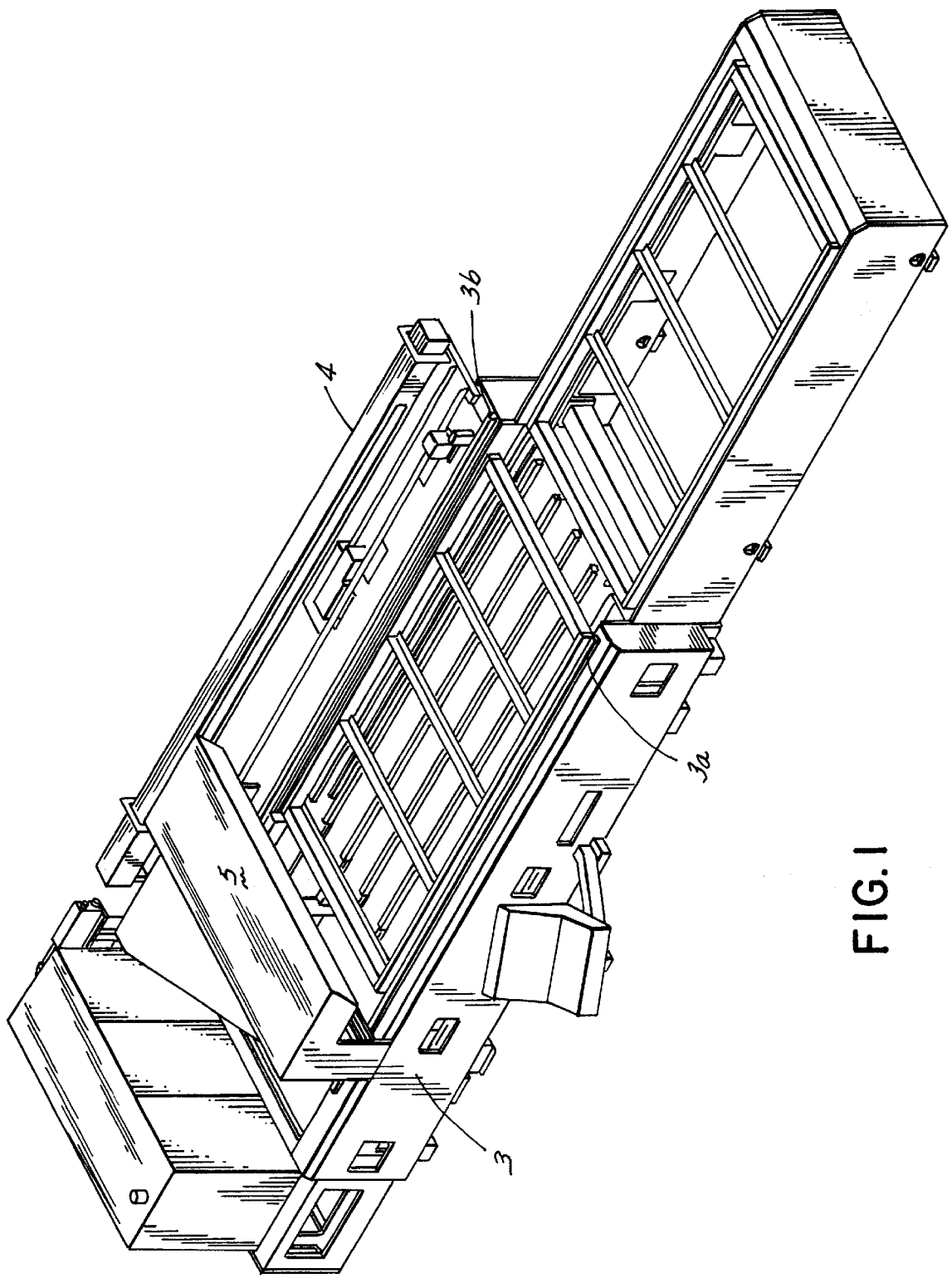
FIG. 1 is a perspective view of a laser cutter.

Referring now to the drawings in detail, wherein like numerals indicate the same elements throughout the views, FIG. 1 is a perspective view of a laser cutter 2, such as the CL-707 sold by Cincinnati Incorporated, the assignee of this patent. Laser cutter 2 has a moving optics system in which the material remains stationary as the laser beam cuts the material. Laser cutter 2 includes main frame 3, support member 4 which is parallel to the X axis and gantry 5. Gantry 5 is moveably supported at either end by tracks 3a and 3b of main frame 3. A pair of support tubes 6a, 6b (FIG. 8), which are parallel to the Y axis, are supported at either end by gantry 5.

Figure 2:
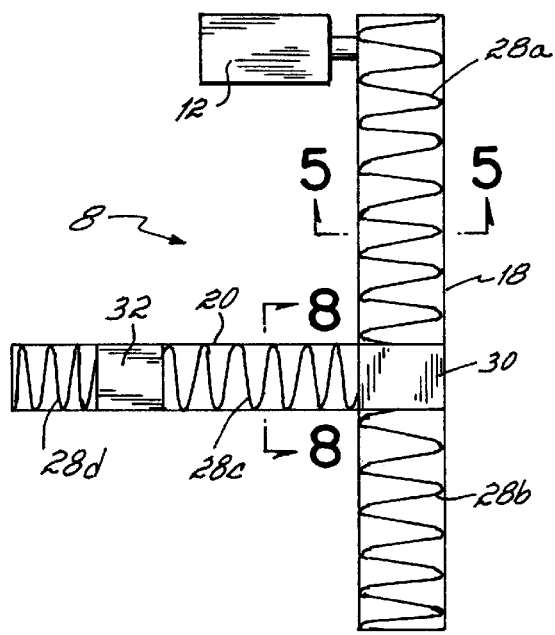
FIG. 2 is a fragmentary, diagrammatic plan view of a beam delivery system used with the laser cutter of FIG. 1.
Figure 3:
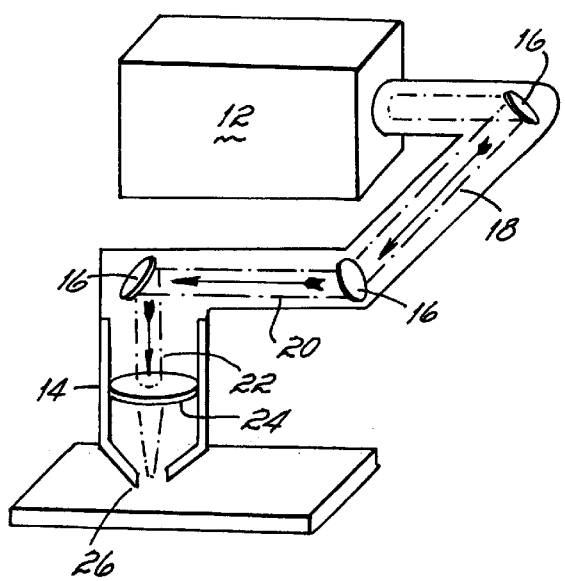
FIG. 3 is a diagrammatic perspective view of the beam delivery system.

Referring also to FIG. 2 which is a fragmentary, diagrammatic plan view of the beam delivery system used with the laser cutter of FIG. 1, and FIG. 3 which is a diagrammatic perspective view of the beam delivery system, beam delivery system is generally indicated at 8. A beam delivery system directs the photon energy beam from one location to another, referred to herein as a target, such as material to be cut for a laser cutter. As is typical for laser cutting equipment, beam delivery system 8 directs laser beam 10 from resonator 12 to laser head 14. Laser beam 10 is directed by mirrors 16 along X axis 18, Y axis 20, and Z axis 22, through focal lens 24 to nozzle tip 26. Bellows 28a–28d surround the path of laser beam 10 and encloses beam delivery system 8. Bellows 28a and 28b extend from a respective end of support member 4 (not visible in FIGS. 2 and 3) to mirror housing 30, which reciprocates along X axis 18. The mirror carried by mirror housing 30 directs laser beam 10 from X axis 18 to Y axis 20. Bellows 28c extends from mirror housing 30 to mirror housing 32 and bellows 28d extends from mirror housing 32 to the end of tubes 6a, 6b. In the depicted embodiment, although bellows 28a–28d are made from non-porous fabric, the seams can develop leaks due to flexing fatigue. Mirror housing 32 reciprocates along Y axis 20, supports focal lens 24 and nozzle tip 26, and carries the mirror which directs laser beam 10 from Y axis 20 to Z axis 22.

Figure 4A:
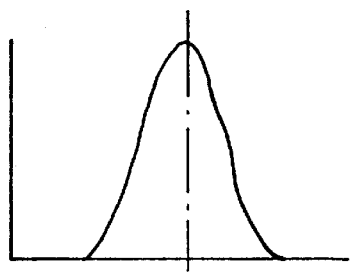
FIGS. 4A–D are power distribution profiles.
Figure 4B:
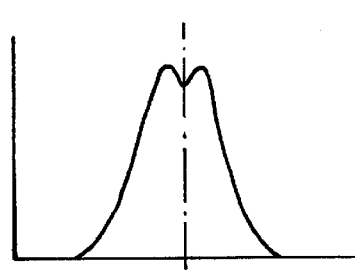
Figure 4C:
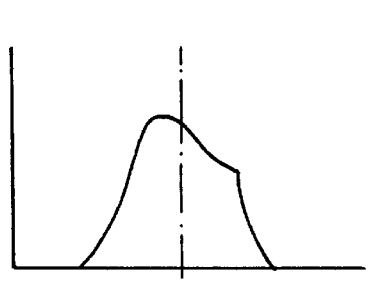
Figure 4D:
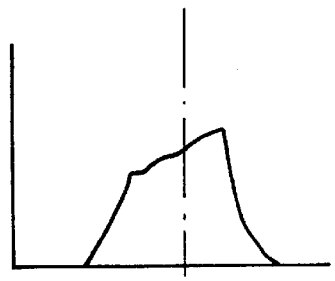

As discussed above, it is desirable for the photon energy beam to have a radially symmetrical power distribution which is constant along the length of the beam. The initial quality of the beam is dependant on the resonator: The beam delivery system does not improve the quality of the beam. The resonator is selected based on the beam desired. Generally, for laser cutting, a Gaussian beam (TEM00), depicted in FIG. 4A, or a TEM01*, depicted in FIG. 4B, are desired. The goal of a beam delivery system of the present invention is to reduce as much as possible, preferably eliminating or minimizing, any degradation of beam quality between the resonator and the target. FIGS. 4C and 4D illustrate exemplary asymmetrical power distributions that have been degraded through use of a prior art beam delivery system.

In the beam delivery system of the present invention, a gas distribution tube is used to distribute air along all or part of the length of the laser beam path. It is noted that although in the embodiment depicted herein, dried and filtered air (produced by a Balston #75-20-L101, with a dew point temperature of about −20° Celsius) was used as the gas through which the beam was propagated, any suitable gas may be used. In the practice of this invention, even moist, non-filtered air may be used. However, it is noted that while it is functional to provide the turbulation adjacent the beam path, moist, non-filtered air is not very practical as it may contaminate components of the beam delivery system, such as mirrors or lenses, and interfere with the operation.

Figure 5:
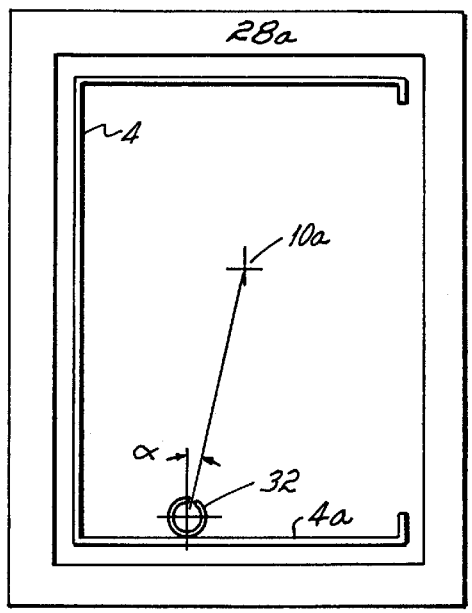
FIG. 5 is a cross sectional view taken at the location of line 5—5 of FIG. 2.

Referring to FIG. 5, which is a cross sectional view of beam delivery system 8 taken at the location of line 5—5 of FIG. 2, bellows 28a surrounds and is generally supported along its length by support member 4 (although contact between bellows 28a and support member 4 is not shown in FIG. 5). Laser beam 10 follows beam path 10a located generally near the center of support member 4. Gas distribution tube 32 is shown adjacent beam path 10a, supported by the bottom surface 4a of support member 4 and extending the length of X axis 18. Gas distribution tube 32 has a plurality of openings 32a generally aimed toward beam path 10a. Gas distribution tube 32 is held in place in any conventional way.

Figure 6:
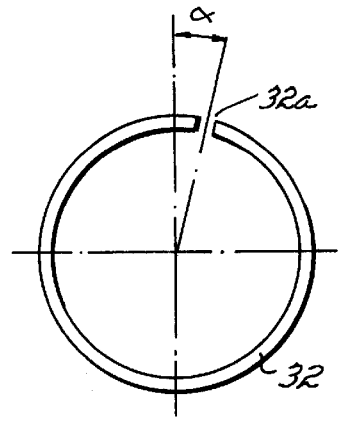
FIG. 6 is an enlarged cross sectional view of the gas distribution tube shown in FIG. 5.

In the embodiment illustrated, gas distribution tube 32 is a 0.219 inches ID copper tube connected at one end to a source of pressurized air (not shown) and sealed at the other end. Openings 32a have a diameter of 0.032 inches and are spaced 12 inches apart. As shown in FIGS. 5 and 6, which is an enlarged cross sectional view of gas distribution tube 32, gas distribution tube 32 is not located directly below beam path 10a, but is disposed to one side such that angle α is 10°±5°.

Figure 7:
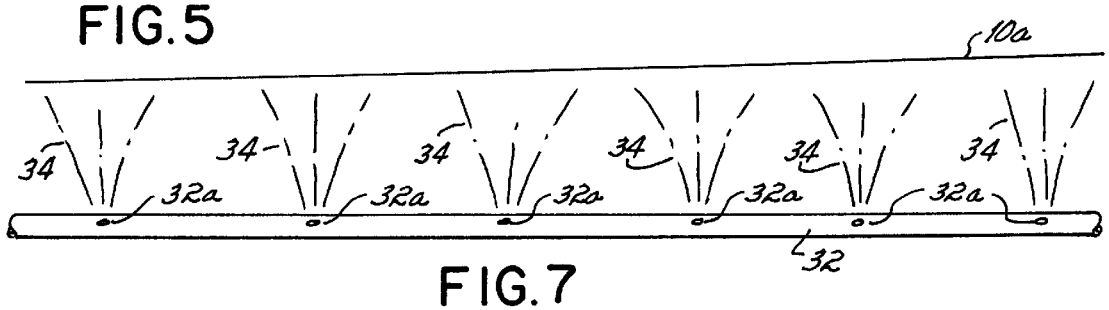
FIG. 7 is a diagrammatic side view of the gas distribution tube of FIGS. 5 and 6.

FIG. 7 is a diagrammatic side view of gas distribution tube 32 illustrating the discharge of discrete air flows 34 of air into beam path 10a. In one embodiment, air is supplied to a CL-707 laser with a Rofin DC 025 2500 watt $CO_2$ slab laser, at 350 SCFH, 30 PSIG, and −20° C. dew point. Approximately 250 SCFH was delivered to the X axis gas distribution tube and approximately 75 SCFH was delivered to the Y axis gas distribution tube. The volume of air depends primarily on the length of the beam path, as well as the size and leak rate of the enclosure, if any. For a CL-707, a range of 300 to 600 SCFH at 20–35 PSIG has been used. While not yet tested, lower pressures and flow rates may also produce acceptable results.

As mentioned above, the area enclosed by bellows 28a–28d is not air tight, which allows the air to flow out of gas discharge tube 32 into beam path 10a and along the axes more freely. It is believed that the reduction, elimination or minimization of beam degradation results from the prevention or reduction in thermal and/or density gradients in the gas at or adjacent the beam path, as well as the prevention or reduction of stagnated gas at the beam path. The amount of air flow directed at and/or turbulence created at the beam path along at least a portion of the beam path length is selected so as to produce the desired improvement in beam degradation.

There are many alternatives to the location and type of gas distribution tube 32. An important function of gas distribution tube 32 is to distribute gas flow proximal beam path 10a to reduce, eliminate or minimize any degradation of the photon energy beam, to provide a consistent power distribution for the length of the beam path, approaching and preferably achieving the initial beam quality. Gas distribution tube 32 could be mounted to any of the sides of support member 4. Any structure which can distribute gas along its length, whether discretely or due to uniform porosity, can be used. For example, in one embodiment, a polyethylene tube was used. In such case, the tube was secured in place by tape, such as HVAC tape, and slits cut with an Exacto™ knife in the tube side after installation, which simplified proper orientation of the openings 32a toward the beam path 10a. Any material may be used for gas distribution tube 32 as long as it does not interfere with the beam propagation. Materials which release gases that interfere with beam propagation, such as rubber, should be avoided. A passageway which is uniformly porous, such as a tube made of a non-woven material, with sufficient internal pressure may also work.

Figure 8:
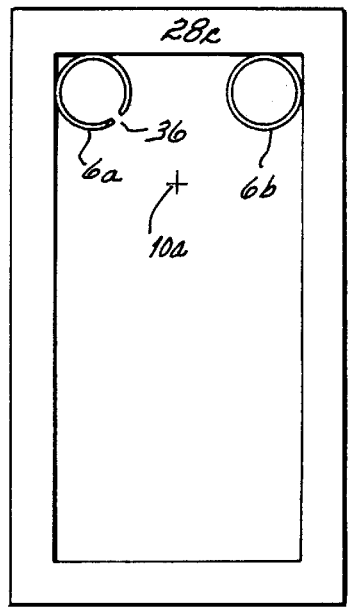
FIG. 8 is a cross sectional view taken at the location of line 8—8 of FIG. 2.

FIG. 8, which is a cross sectional view taken at the location of line 8—8 of FIG. 2, illustrates bellows 28c generally supported by support tubes 6a and 6b. Support tube 6a includes a plurality of openings 36 generally aimed toward beam path 10a. The interior of support tube 6a is connected to a source of pressurized air (not shown) in any conventional manner, such as through a fitting through the wall of support tube 6a. Any alternative structure capable of delivering air proximal to beam path 10a may be used, such as a separate tube, although the use of support tube 6a is convenient as it is already present.

Although the present embodiment specifically illustrates the gas being discharged transverse, and in particularly generally perpendicular, to beam path 20a, other directions may be used so long as a sufficient amount of air flow is produced proximal to beam path 10a to produce the desired gas movement within the beam path sufficient to reduce, eliminate or minimize degradation of beam quality. The gas flow does not have to be strictly transverse, although the required gas flow increases with a decrease in the angle between the air flow and the beam path and with distance from the beam path.

Gas flow may be introduced proximal to the beam path by the axial introduction of an amount of gas sufficient to produce the desired gas movement within the beam path throughout a sufficient length of the beam path. However, axial flow introduced at a single location, such as adjacent the resonator, will require a significant flow rate in order to obtain the desired gas movement at the remote end of the beam path.

Although a beam path 10a enclosed by a bellows system is depicted, the practice of the present invention is not necessarily limited to enclosed beam paths. The present invention teaches and encompasses the distribution of gas proximal to the beam path in an amount sufficient to produce the desired gas movement within the beam path along a length of the beam path sufficient to produce the desired reduction, elimination or minimization of degradation of beam quality, regardless of whether an enclosure is used with the beam delivery system. Additionally, the present invention may be used with a sealed beam delivery system.

Although a moving optics system has been depicted, the present invention may also be used with a stationary optics system.

In the depicted embodiment, a gas discharge tube is used along the length of X axis 18 and Y axis 20, but not along Z axis 22, although it could be. The present invention may also be practiced without a gas discharge tube along Y axis 20, as it is believed that about seventy five percent of the improvement in the power distribution can be achieved by using a gas discharge tube along only X axis 18. Of course, the amount of improvement depends on the amount of gas flow proximal to the beam path. When the length of the beam path along X axis 18 is small, such as when material is cut near field, gas discharge along X axis 18 has less effect than when the length of the beam path along X axis 18 is long, such as when material is cut far field.

Although the present invention has been described in reference to a laser beam, is may be used with any photon beam delivery system.

In summary, numerous benefits have been described which result form employing the concepts of the invention. The foregoing description of a preferred embodiment of the invention has been presented for purposes of illustration and description. It is not intended to be exhaustive or to limit the invention to the precise form disclosed. Obvious modifications or variations are possible in light of the above teachings. The embodiment was chosen and described in order to best illustrate the principles of the invention and its practical application to thereby enable one of ordinary skill in the art to best utilize the invention in various embodiments and with various modifications as are suited to the particular use contemplated. It is intended that the scope of the invention be defined by the claims appended hereto.

What is claimed is:

1. A beam delivery system in which a photon energy beam is directed along a beam path, said beam delivery system comprising an outer housing at least partially surrounding a length of the beam path and a gas distribution tube positioned within said outer housing proximate at least a portion of the length of the beam path, said gas distribution tube having a plurality of spaced-apart openings therein for delivering a flow of a pressurized gas directed substantially toward the beam path at a plurality of locations.

2. The beam delivery system of claim 1, wherein said openings are adapted to deliver said flow of said pressurized gas substantially perpendicular to the beam path.

3. The beam delivery system of claim 1, wherein said outer housing is adapted to permit said pressurized gas to flow out of said outer housing.

4. The beam delivery system of claim 1, wherein said gas distribution tube is positioned along substantially the entire length of said beam path.

5. The beam delivery system of claim 1, wherein said outer housing comprises a first outer housing and said gas distribution tube comprises a first gas distribution tube for delivering a first flow of a first pressurized gas proximate a first length of the beam path, said system further comprising a second outer housing at least partially surrounding a second length of the beam path and intersecting at an angle with respect to said first housing and a second gas distribution tube positioned within said second outer housing, said second gas distribution tube configured to deliver a second flow of a second pressurized gas proximate at least a portion of the second length of the beam path.

6. The beam delivery system of claim 5, wherein said first and second gas distribution tubes are in fluid communication.

7. The beam delivery system of claim 5, further comprising a first optical element for redirecting the beam path from the first length of the beam path to the second length of the beam path.

8. The beam delivery system of claim 5, further comprising a third outer housing at least partially surrounding a third length of the beam path and intersecting at an angle with respect to said third housing and a third gas distribution tube positioned within said third outer housing, said third gas distribution tube configured to deliver a third flow of a third pressurized gas proximate at least a portion of the third length of the beam path.

9. The beam delivery system of claim 8, wherein at least two of said first, second and third gas distribution tubes are in fluid communication.

10. The beam delivery system of claim 8, further comprising a second optical element for redirecting the beam path from the second length of the beam path to the third length of the beam path.

11. The beam delivery system of claim 1, wherein said gas distribution tube is generally aligned relative to the beam path.

12. The beam delivery system of claim 11, wherein said gas distribution tube is aligned substantially parallel to the beam path.

13. The beam delivery system of claim 1, further comprising a gas source capable of providing said pressurized gas to said gas distribution tube.

14. The beam delivery system of claim 13, wherein said gas source is a source of dried and filtered air and said gas is dried and filtered air.

15. The beam delivery system of claim 1, wherein said openings are adapted to deliver said flow of said pressurized gas directed substantially transverse toward the beam path.

16. The beam delivery system of claim 1, wherein said gas distribution tube mechanically supports said outer housing.

17. The beam delivery system of claim 1, wherein said gas distribution tube is formed of a uniformly porous material.

18. A beam delivery system in which a photon energy beam is directed along a beam path, said beam delivery system comprising an outer housing at least partially surrounding the beam path and a gas distribution tube positioned within said outer housing, said gas distribution tube having a plurality of openings spaced along the axis of said gas distribution tube and said openings capable of delivering a flow of a pressurized gas generally directed toward the beam path.

19. The beam delivery system of claim 18, wherein said gas distribution tube is aligned relative to the beam path.

20. The beam delivery system of claim 19, wherein said gas distribution tube is aligned substantially parallel to the beam path.

21. The beam delivery system of claim 18, wherein said openings are adapted to deliver said flow of said pressurized gas generally perpendicular to the beam path.

22. The beam delivery system of claim 18, wherein said outer housing is adapted to permit said pressurized gas to flow out of said outer housing.

23. The beam delivery system of claim 18, wherein said gas distribution tube extends substantially the entire length of the beam path.

* * * * *